United States Patent
Wong et al.

(10) Patent No.: US 8,736,692 B1
(45) Date of Patent: May 27, 2014

(54) USING INVOLUNTARY ORBITAL MOVEMENTS TO STABILIZE A VIDEO

(75) Inventors: Adrian Wong, Mountain View, CA (US); Ryan Geiss, San Jose, CA (US)

(73) Assignee: Google Inc., Mountain View, CA (US)

( * ) Notice: Subject to any disclaimer, the term of this patent is extended or adjusted under 35 U.S.C. 154(b) by 61 days.

(21) Appl. No.: 13/544,245

(22) Filed: Jul. 9, 2012

(51) Int. Cl.
*H04N 5/228* (2006.01)

(52) U.S. Cl.
USPC ........................................................ 348/208.4

(58) Field of Classification Search
USPC ........................................................ 348/208.4
See application file for complete search history.

(56) References Cited

U.S. PATENT DOCUMENTS

| | | | |
|---|---|---|---|
| 5,742,264 A | 4/1998 | Inagaki et al. | |
| 6,381,339 B1 | 4/2002 | Brown et al. | |
| 7,206,022 B2 | 4/2007 | Miller et al. | |
| 7,239,976 B2 | 7/2007 | Coleman et al. | |
| 7,259,785 B2 | 8/2007 | Stavely et al. | |
| 7,542,210 B2 | 6/2009 | Chirieleison, Sr. | |
| 7,957,810 B2 | 6/2011 | Greenberg et al. | |
| 8,040,420 B2 | 10/2011 | Horie | |
| 8,135,227 B2 | 3/2012 | Lewis et al. | |
| 2002/0036750 A1* | 3/2002 | Eberl et al. | 351/207 |
| 2002/0101510 A1* | 8/2002 | Basson et al. | 348/169 |
| 2004/0061831 A1* | 4/2004 | Aughey et al. | 351/209 |
| 2004/0196433 A1* | 10/2004 | Durnell | 351/209 |
| 2005/0007552 A1* | 1/2005 | Fergason et al. | 351/210 |
| 2005/0231599 A1* | 10/2005 | Yamasaki | 348/207.99 |
| 2006/0009702 A1* | 1/2006 | Iwaki et al. | 600/520 |
| 2006/0147197 A1* | 7/2006 | Spruck et al. | 396/429 |
| 2008/0034954 A1 | 2/2008 | Grober | |
| 2008/0309873 A1* | 12/2008 | Levecq et al. | 351/209 |
| 2009/0147126 A1* | 6/2009 | Miyoshi et al. | 348/360 |
| 2009/0243966 A1* | 10/2009 | Kato et al. | 345/8 |
| 2010/0053555 A1* | 3/2010 | Enriquez et al. | 351/210 |
| 2010/0061657 A1* | 3/2010 | Chien | 382/276 |
| 2011/0221896 A1 | 9/2011 | Haddick et al. | |
| 2011/0298937 A1* | 12/2011 | Ogawa et al. | 348/208.4 |
| 2012/0044347 A1* | 2/2012 | Sugio | 348/135 |
| 2012/0120264 A1* | 5/2012 | Lee et al. | 348/208.4 |
| 2012/0194551 A1* | 8/2012 | Osterhout et al. | 345/633 |
| 2012/0320224 A1* | 12/2012 | Miyoshi et al. | 348/207.1 |

OTHER PUBLICATIONS

Ryu, Yeon Geol et al., Video Stabilization for Robot Eye Using IMU-Aided Feature Tracker, International Conference on Control Automation and Systems 2010 (ICCAS), Oct. 27-30, 2010, Gyeonggi-do, Korea.

* cited by examiner

*Primary Examiner* — Nicholas Giles
*Assistant Examiner* — Abdelaaziz Tissire
(74) *Attorney, Agent, or Firm* — McDonnell Boehnen Hulbert & Berghoff LLP

(57) ABSTRACT

Methods and systems for using eye-tracking data to stabilize a video are provided. An example method may involve receiving a video captured using a body-mountable camera and receiving gaze-direction data from one or more head-mountable eye trackers. Additionally, the method may include analyzing the received gaze-direction data to detect at least one involuntary orbital eye-movement. According to the method, the received video may be stabilized based at least in part on the detected at least one involuntary orbital eye-movement, and the stabilized video may be sent In some instances, camera-movement data may also be received and utilized to detect involuntary orbital eye-movements or stabilize the received video.

23 Claims, 8 Drawing Sheets

USING INVOLUNTARY ORBITAL MOVEMENTS TO STABILIZE A VIDEO

BACKGROUND

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

SUMMARY

In one example aspect, a method is provided that involves receiving, at a computing device, a video captured using a body-mountable camera and receiving, at the computing device, gaze-direction data from one or more head-mountable eye trackers. Additionally, the method may include analyzing the received gaze-direction data using the computing device to detect at least one involuntary orbital eye-movement. According to the method, the received video may be stabilized based at least in part on the detected at least one involuntary orbital eye-movement, and the stabilized video may be sent.

In another example aspect, a system is provided that involves a non-transitory computer-readable medium and program instructions stored on the non-transitory computer-readable medium. The program instructions may be executable by at least one processor to receive a video captured using a body-mountable camera and receive gaze-direction data from one or more head-mountable eye trackers. The program instructions may also be executable by the at least one processor to analyze the received gaze-direction data to detect at least one involuntary orbital eye-movement. The program instructions may be further executable by the at least one processor to stabilize the received video based at least in part on the at least one involuntary orbital eye-movement, and send the stabilized video.

In another example aspect, a non-transitory computer-readable medium having stored thereon program instructions executable by at least one processor is provided. The program instructions may be executable by the least one processor to receive a video captured by a body-mountable camera and receive gaze-direction data from one or more head-mountable eye trackers. The program instructions may also be executable by the at least one processor to analyze the received gaze-direction data to detect at least one involuntary orbital eye-movement. The program instructions may be further executable by the at least one processor to stabilize the received video based at least in part on the at least one involuntary orbital eye-movement, and send the stabilized video.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1A:
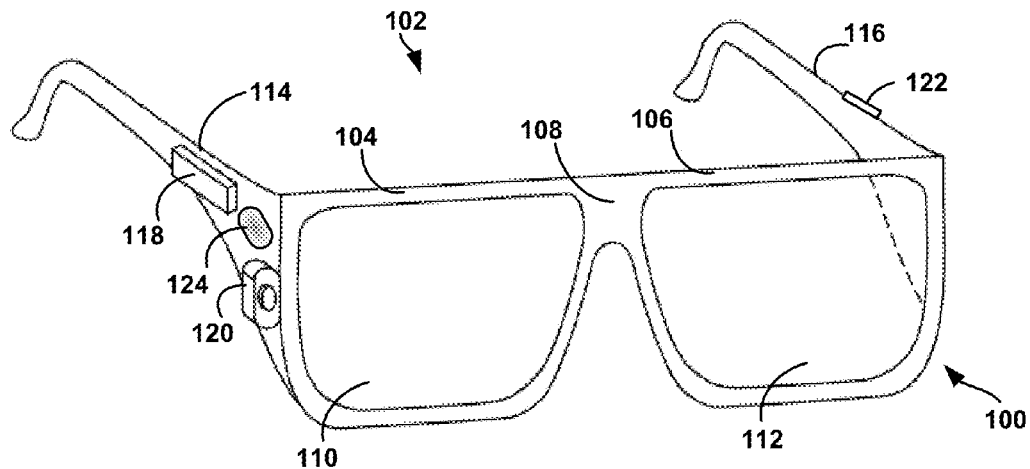
FIG. 1A illustrates a wearable computing system.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

Disclosed herein are methods and systems for using eye-tracking data to stabilize a video. In some instances, a video captured by a body-mountable camera may become shaky or unstable due to motion of a wearer of the camera while the video is captured. To compensate for the instability of the video, a system may track movement of a user's eyes and stabilize the video based on the movement of the user's eyes.

As an example scenario, a user may be moving quickly while capturing a video on a head-mounted camera, and the user's head may be moving around while the video is captured. As a result, the captured video may be unstable. However, if the user is looking at a stationary object or point, the user's eyes will instinctively stabilize the user's view by moving the user's eyes to compensate for the head motion. Similarly, by copying the user's eye movements, a camera system may be modified to produce a more stable view in a captured video.

In one instance, a wide-angle video may be captured, and the wide-angle video may be cropped to record a portion of the video. Based on eye-movement data that is tracked while the video is captured, the cropped portion may be dynamically adjusted. In a further example, the system may correlate eye-movement data with data from other motion sensors, such as a gyroscope or accelerometer coupled to a camera. For instance, when a user glances around or begins looking at a new object, the resulting eye-movement data is not likely to correlate well with data simultaneously collected by the other motion sensors. In contrast, when the user concentrates on one object or point, the resulting eye-movement data will correlate with motion detected by the other motion sensors. In some instances, eye-movement data may be determined based on data received from an orientation sensor (e.g., a gyroscope) embedded in a contact lens. The data from the orientation sensor of the contact lens may then be compared to data from a similar sensor mounted on a user's head. Thus, the system may calculate an amount of correlation between eye-movement data and data from the other motion sensors in order to ignore eye-movement data that is not sufficiently correlated with the data from the other sensors.

Although the examples described herein are described with respect to stabilizing a captured video, the example is not meant to be limiting. The methods may also be applicable to visual object tracking or determining a user's area of interest. For instance, by correlating eye-movement data with head-movement data, a computing device may be able to determine an object that a user is tracking or a region that a user is looking at even if a field of view of a head-mounted camera is moving.

The above examples are a few of the many applications of methods and systems described herein. The above examples and the other examples described herein are provided for illustrative purposes and are not intended to be limiting. It is contemplated that the systems and methods may be advantageous to a variety of systems that may utilize eye-tracking data to stabilize a video.

2. Example Systems and Device Architectures

FIG. 1A illustrates a wearable computing system 100 according to an exemplary embodiment. In FIG. 1A, the wearable computing system 100 takes the form of a head-mounted device (HMD) 102 (which may also be referred to as a head-mounted display). It should be understood, however, that exemplary systems and devices may take the form of or be implemented within or in association with other types of devices, without departing from the scope of the invention. As illustrated in FIG. 1A, the head-mounted device 102 comprises frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements 110, 112.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the HMD 102 may connect to or be affixed within a head-mounted helmet structure. In another example, the display may be embedded within a contact lens or multiple contact lenses. Other possibilities exist as well.

The HMD 102 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be wire-connected or wirelessly-connected to the head-mounted device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Many video cameras with a small form-factor, such as those used in cell phones or webcams, for example, may be incorporated into an example of the HMD 102. In some embodiments, the video camera 120 may be separate from the head-mounted device 102. For instance, the video camera 120 may be mounted on a hat, headband, or jewelry of a user and may be connected to the head-mounted device via a wired or wireless connection.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function. In another example, the finger-operable touch pad 124 may be configured to sense a distance of a hand or finger from the surface. Optionally, the finger-operable touch pad 124 may send out ultrasonic waves that fill a 3D touchable area, providing feedback to a user when the user's finger is within the 3D touchable area.

Figure 1B:
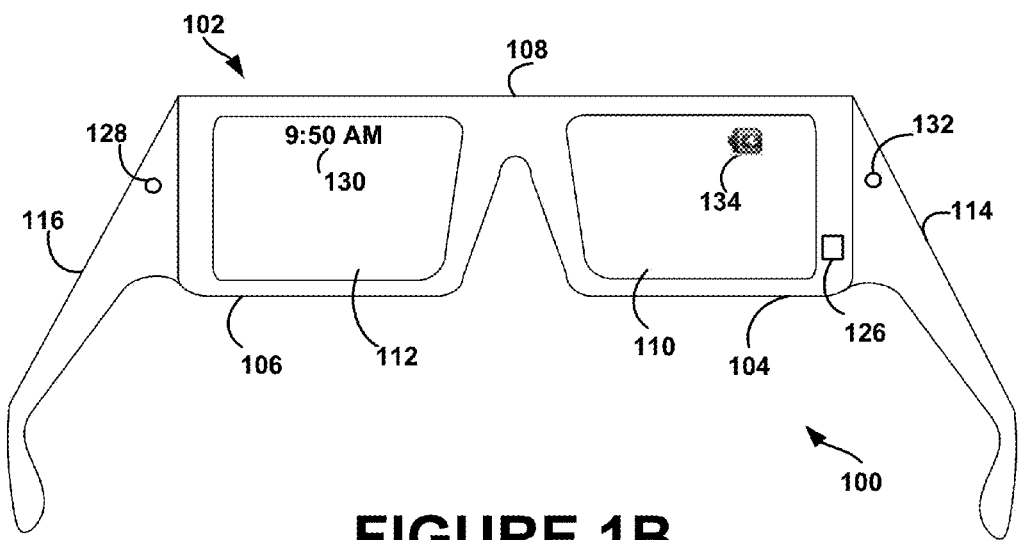
FIG. 1B illustrates an alternate view of the wearable computing system illustrated in FIG. 1A.

FIG. 1B illustrates an alternate view of the wearable computing system 100 illustrated in FIG. 1A. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Although not explicitly shown in the figures, the HMD 102 could include an eye-tracking system or a portion of such a system. In an example embodiment, the HMD 102 could include inward-facing or rearward-facing (i.e., eye-facing) light source(s) and/or camera(s) to facilitate eye-tracking functions. For example, an HMD may include inward-facing light sources, such as an LED(s), at generally known location(s) with respect to one another and/or with respect to an eye under observation. The inward-facing camera may therefore capture images that include the reflections of the light source(s) off the eye; or in other words, images that capture the controlled glints that correspond to the inward-facing light sources. As such, the positioning of the controlled glints in given image may be indicative of the position of the eye at the time the image was captured.

In a further aspect, with the above configuration, successive video frames may capture movement of the controlled glints in the image plane as one or more eyes move. Thus, with the relative geometry of the controlled light source and the one or more eyes known, the observed movement of the controlled glints in the image plane may be analyzed in order to measure the movement of the eye.

In another example, the eye tracking system may be a camera-based tracking system configured to detect visible or infrared light. In still another example, a contact lens may be provided with an embedded chip. The contact lens may be worn by a user, and a sensor in the head-mounted device 102 may be able to perceive the location of the embedded chip. The example eye-tracking systems described above are not meant to be limiting, and any type of eye-tracking system may be used.

While the wearable computing system 100 of the example embodiment illustrated in FIGS. 1A and 1B is configured as a unified package, integrated in the HMD component, other configurations are possible as well. For example, although not explicitly shown in FIGS. 1A and 1B, the wearable computing system 100 could be implemented in a distributed architecture in which all or part of the on-board computing system 118 is configured remotely from the HMD 102. For example, some or all of the on-board computing system 118 could be made wearable in or on clothing as an accessory, such as in a garment pocket or on a belt clip. Similarly, other components depicted in FIGS. 1A and/or 1B as integrated in the HMD 102 could also be configured remotely from the HMD 102. In such a distributed architecture, certain components might still be integrated in the HMD 102. For instance, one or more sensors (e.g., a magnetometer, gyroscope, etc.) could be integrated in the HMD 102.

In an example distributed configuration, the HMD 102 (including other integrated components) could communicate with remote components via the communication interface 126 (or via a dedicated connection, distinct from the communication interface 126). By way of example, a wired (e.g. USB or Ethernet) or wireless (e.g., WiFi or Bluetooth) connection could support communications between a remote computing system and the HMD 102. Additionally, such a communication link could be implemented between the HMD 102 and other remote devices, such as a laptop computer or a mobile telephone, for instance.

Figure 1C:
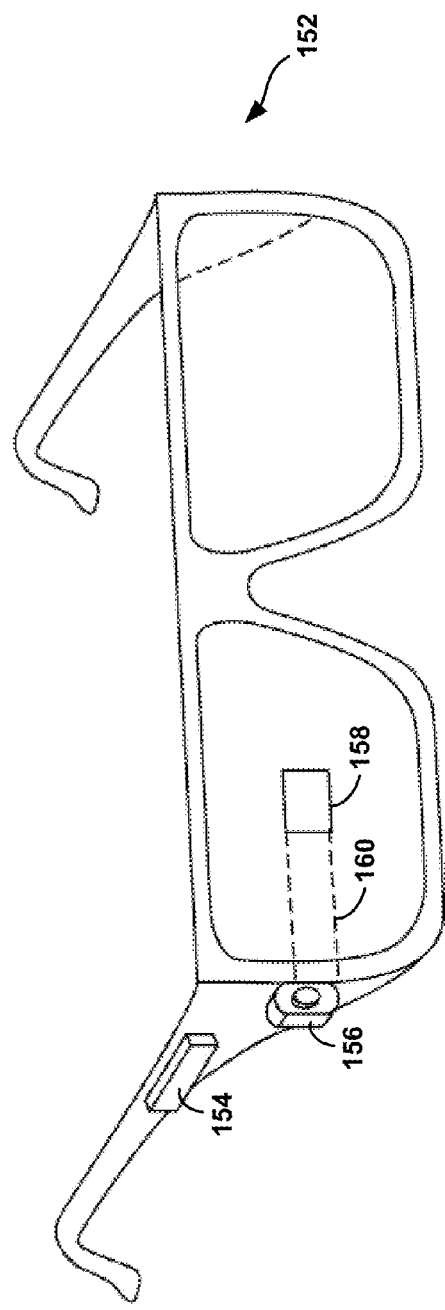
FIG. 1C illustrates another wearable computing system.

FIG. 1C illustrates another wearable computing system, which takes the form of an HMD 152. The HMD 152 may include frame elements and side-arms such as those described with respect to FIGS. 1A and 1B. The HMD 152 may additionally include an on-board computing system 154 and a video camera 156, such as those described with respect to FIGS. 1A and 1B. The video camera 156 is shown mounted on a frame of the HMD 152. However, the video camera 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions. The display 158 is controllable via the computing system 154 that is coupled to the display 158 via an optical waveguide 160.

Figure 1D:
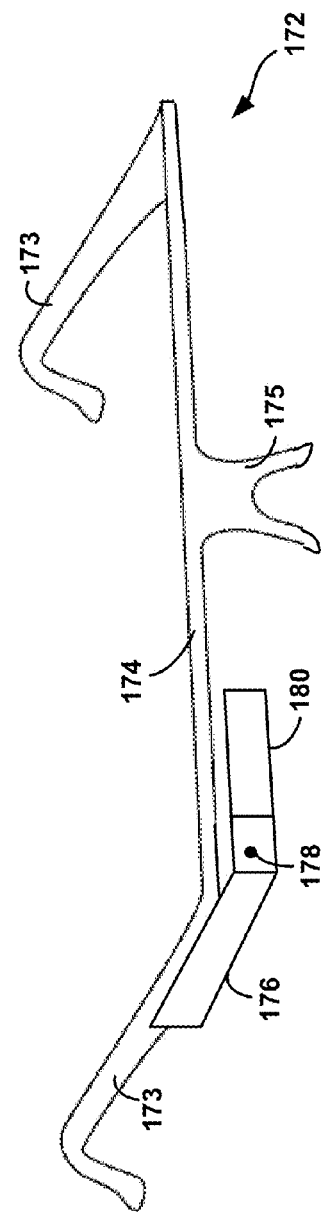
FIG. 1D illustrates yet another wearable computing system.

FIG. 1D illustrates another wearable computing system, which takes the form of an HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include an on-board computing system 176 and a video camera 178, such as those described with respect to FIGS. 1A and 1B.

The HMD 172 may include a single lens element 180 that may be coupled to one of the side-arms 173 or the center frame support 174. The lens element 180 may include a display such as the display described with reference to FIGS. 1A and 1B, and may be configured to overlay computer-generated graphics upon the user's view of the physical world. In one example, the single lens element 180 may be coupled to the inner side (i.e., the side exposed to a portion of a user's head when worn by the user) of the extending side-arm 173. The single lens element 180 may be positioned in front of or proximate to a user's eye when the HMD 172 is worn by a user. For example, the single lens element 180 may be positioned below the center frame support 174, as shown in FIG. 1D.

Figure 2:
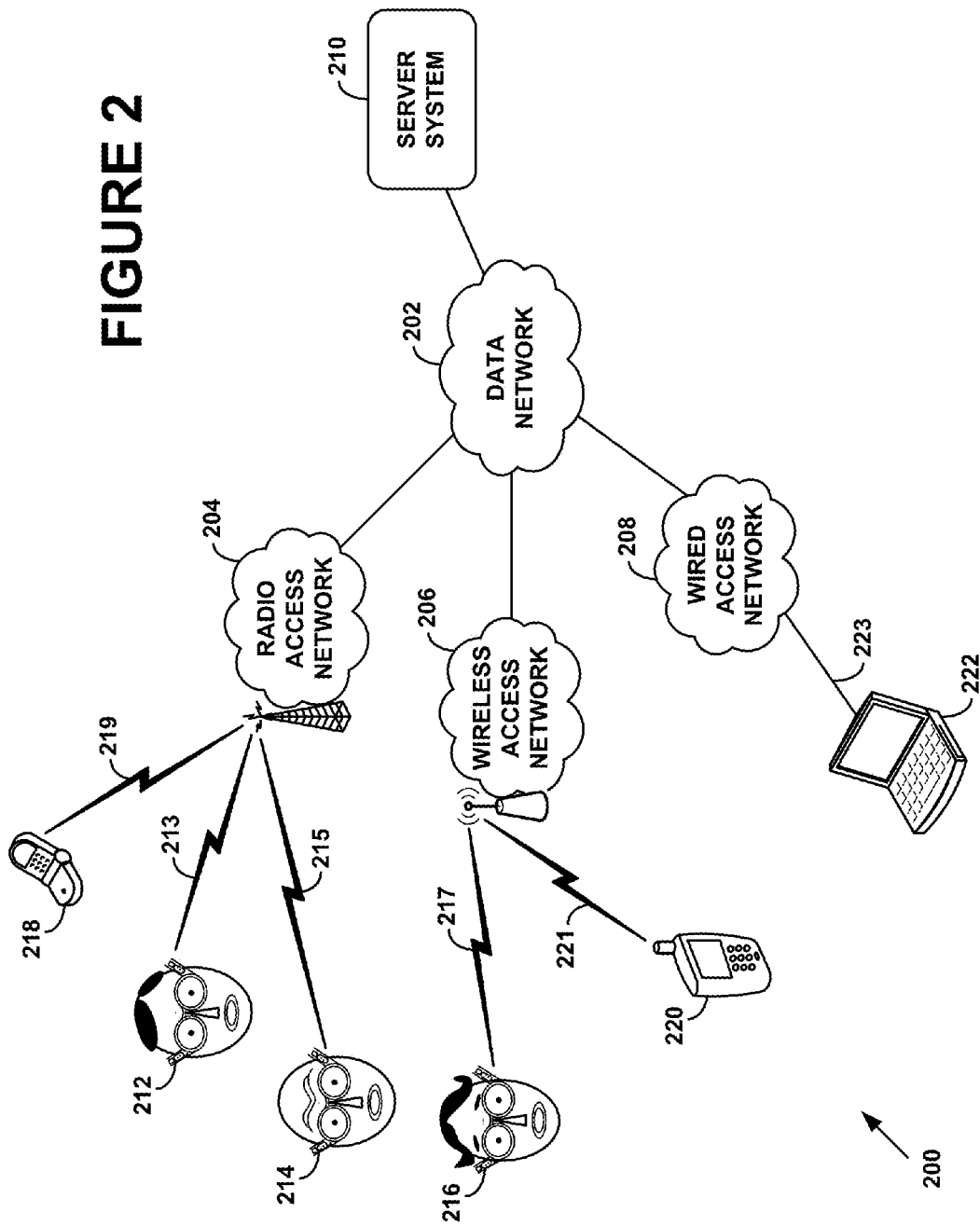
FIG. 2 is a simplified illustration of a network via which one or more devices may engage in communications.

FIG. 2 is a simplified illustration of a network 200 via which one or more devices may engage in communications. For example, one or more of the devices illustrated in FIGS. 1A-1D may engage in communications via the network 200. As depicted, the network 200 includes a data network 202 that is connected to each of a radio access network (RAN) 204, a wireless access network 206, and a wired access network 208. The data network 202 could represent the one or more interconnected communication networks, such as or including the Internet. The radio access network 204 could represent a service provider's cellular radio network supporting, for instance, 3G and/or 4G cellular radio technologies (e.g., CDMA, EVDO, GSM, UMTS, LTE, WiMAX). The wireless access network 206 could represent a residential or hot-spot wireless area network supporting, such as, Bluetooth, ZigBee, and WiFi (e.g., 802.11a, 802.11b, 802.11g). The wired access network 208 could represent a residential or commercial local area network supporting, for instance, Ethernet.

The network 200 also includes a server system 210 connected to the data network 202. The server system 210 could represent a website or other network-based facility for providing one or another type of service to users. For instance, in accordance with an example embodiment, the server system 210 could host an online social networking service or website. As another example, the server system 210 could provide a network-based information search service. As still a further example, the server system 210 could receive eye-tracking data from a HMD, and returned analyzed results to the HMD.

FIG. 2 also shows various end-user and/or client devices connected to the network 200 via one of the three access networks. By way of example, an HMD 212 is connected to the RAN 204 via an air interface 213 (e.g., a 3G or 4G technology), and an HMD 214 is connected to the RAN 204 via an air interface 215 (e.g., a 3G or 4G technology). Also by way of example, an HMD 216 is connected to the wireless access network 206 via an air interface 217 (e.g., a WiFi technology). In addition and also by way of example, a mobile phone 218 is shown connected to the RAN 204 via an air interface 219, a smart phone 220 is shown connected to the wireless access network 206 via an air interface 221, and a laptop computer 222 is shown connected to the wired access network 208 via a wired interface 223. Each of the end-user devices could communicate with one or another network-connected device via its respective connection with the network. It could be possible as well for some of these end-user devices to communicate directly with each other (or other end-user devices not shown).

Each of the HMDs 212, 214, and 216 is depicted as being worn by different user (each user being represented by a cartoon face) in order to signify possible user-related variables, circumstances, and applications that may be associated with each HMD. For instance, the HMD 212 could at one time upload content to an online social networking service, whereas the HMD 214 could at the same or another time send a request to a network-based information search service. Users could interact with each other and/or with the network via their respective HMDs. Other examples are possible as well. For the purposes of most of the discussion herein it is usually sufficient to reference only an HMD without referencing the user (or wearer) the HMD. Explicit reference to or discussion of a user (or wearer) of an HMD will be made as necessary.

Figure 3A:
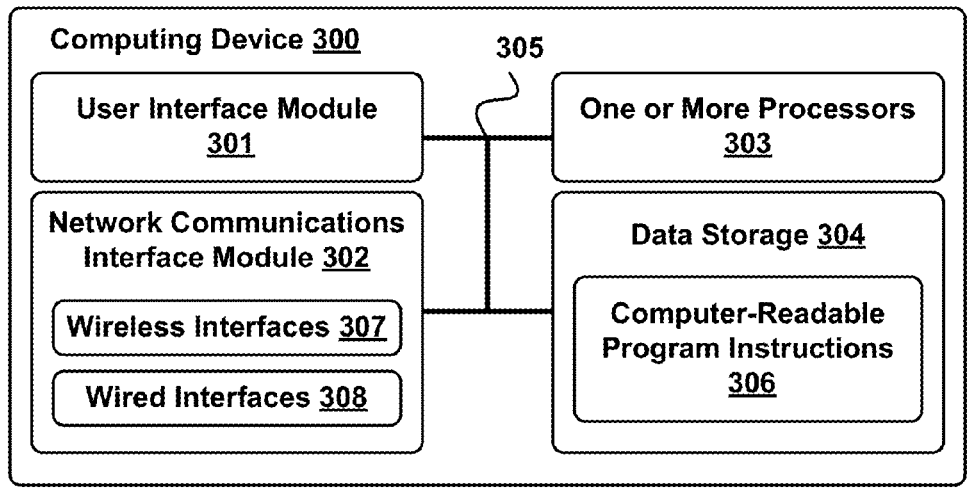
FIG. 3A is a block diagram of a computing device in accordance with an example embodiment.
Figure 3B:
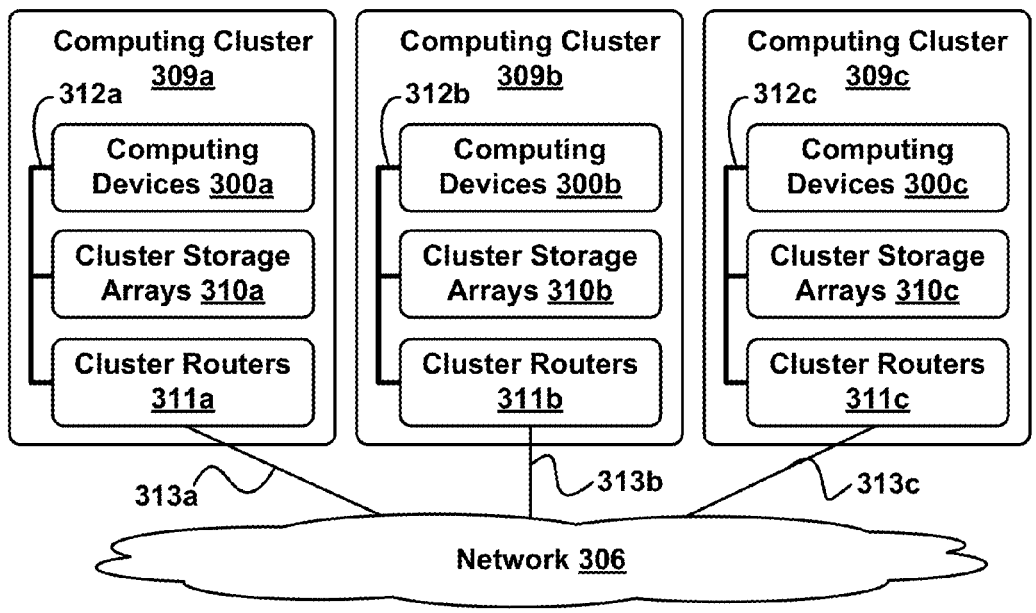
FIG. 3B depicts a network with computing clusters in accordance with an example embodiment.

A network server, such as the server system 210 in FIG. 2, could take various forms and be implemented in one or more different ways. FIGS. 3A and 3B illustrate two example embodiments of a server system: an integrated system including a representative computing device (FIG. 3A), and a distributed system (FIG. 3B) including multiple representative computing devices, as well as additional system elements, communicatively connected together.

FIG. 3A is a block diagram of a computing device 300 in accordance with an example embodiment. As shown, computing device 300 includes a user interface module 301, a network-communication interface module 302, one or more processors 303, and data storage 304, all of which can be linked together via a system bus, network, or other connection mechanism 305. The computing device 300 may be any type of device that can receive data and provide information for display in association with the received data. For example, the device 300 may take the form of or be included as part of a wearable computing device, such as the head-mounted devices 102, 152, or 172 described with reference to FIGS. 1A-1D. Additionally, computing device 300 can act as part of one or more of networks 204, 206, and 208 as well as the afore-mentioned server system 210 of FIG. 2. Further, as noted above, computing device 300 could also take the form of or be included in an integrated server system. Computing device 300 may take other forms and/or be included as part of other systems as well.

The user interface module 301 can be operable to send data to and/or receive data from external user input/output devices. For example, the user interface module 301 can be configured to send/receive data to/from user input devices such as a keyboard, a keypad, a touch screen, a computer mouse, a track ball, a joystick, and/or other similar devices, now known or later developed. The user interface module 301 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 301 can also be configured to generate audible output(s), such as a speaker, speaker jack, audio output port, audio output device, earphones, and/or other similar devices, now known or later developed.

The network-communications interface module 302 can include one or more wireless interfaces 307 and/or wired interfaces 308 that are configurable to communicate via a network, such as the network 202 shown in FIG. 2. The wireless interfaces 307 can include one or more wireless transceivers, such as a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other types of wireless transceivers configurable to communicate via a wireless network. The wired interfaces 308 can include one or more wired transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wired network.

In some embodiments, the network communications interface module 302 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be compressed and decompressed using one or more compression and/or decompression algorithms and/or protocols such as, but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The one or more processors 303 can include one or more general purpose processors and/or one or more special purpose processors (e.g., digital signal processors, application specific integrated circuits, etc.). The one or more processors 303 can be configured to execute computer-readable program instructions 306 that are contained in the data storage 304 and/or other instructions as described herein.

The data storage 304 can include one or more computer-readable storage media that can be read or accessed by at least one of the processors 303. The one or more computer-readable storage media can include volatile and/or non-volatile storage components, such as optical, magnetic, organic or other memory or disc storage, which can be integrated in whole or in part with at least one of the one or more processors 303. In some embodiments, the data storage 304 can be implemented using a single physical device (e.g., one optical, magnetic, organic or other memory or disc storage unit), while in other embodiments, the data storage 304 can be implemented using two or more physical devices.

Computer-readable storage media associated with data storage 304 and/or other computer-readable media described herein can also include non-transitory computer-readable media such as computer-readable media that stores data for short periods of time like register memory, processor cache, and random access memory (RAM). Computer-readable storage media associated with data storage 304 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 304 and/or other computer-readable media described herein can also be any other volatile or non-volatile storage systems. Computer-readable storage media associated with data storage 304 and/or other computer-readable media described herein can be considered computer readable storage media for example, or a tangible storage device.

The data storage 304 can include computer-readable program instructions 306 and perhaps additional data. In some embodiments, the data storage 304 can additionally include storage required to perform at least part of the herein-described techniques, methods, and/or at least part of the functionality of the herein-described devices and networks.

FIG. 3B depicts a network 306 with computing clusters 309a, 309b, and 309c in accordance with an example embodiment. In FIG. 3B, functions of a network server, such as the server system 210 or components of the networks 204, 206, and 208 in FIG. 2, can be distributed among three computing clusters 309a, 309b, and 309c. The computing cluster 309a can include one or more computing devices 300a, cluster storage arrays 310a, and cluster routers 311a, connected together by local cluster network 312a. Similarly, computing cluster 309b can include one or more computing devices 300b, cluster storage arrays 310b, and cluster routers 311b, connected together by local cluster network 312b. Likewise, computing cluster 309c can include one or more computing devices 300c, cluster storage arrays 310c, and cluster routers 311c, connected together by a local cluster network 312c.

In some embodiments, each of computing clusters 309a, 309b, and 309c can have an equal number of computing devices, an equal number of cluster storage arrays, and an equal number of cluster routers. In other embodiments, however, some or all of computing clusters 309a, 309b, and 309c can have different numbers of computing devices, different numbers of cluster storage arrays, and/or different numbers of cluster routers. The number of computing devices, cluster storage arrays, and cluster routers in each computing cluster can depend on the computing task or tasks assigned to each computing cluster.

Cluster storage arrays 310a, 310b, and 310c of computing clusters 309a, 309b, and 309c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

The cluster routers 311a, 311b, and 311c in the computing clusters 309a, 309b, and 309c can include networking equipment configured to provide internal and external communications for the computing clusters. For example, the cluster routers 311a in the computing cluster 309a can include one or more internet switching and/or routing devices configured to provide (i) local area network communications between the computing devices 300a and the cluster storage arrays 301a via the local cluster network 312a, and/or (ii) wide area network communications between the computing cluster 309a and the computing clusters 309b and 309c via the wide area network connection 313a to the network 306. The cluster routers 311b and 311c can include network equipment similar to the cluster routers 311a, and the cluster routers 311b and 311c can perform similar networking functions for the computing clusters 309b and 309b that the cluster routers 311a perform for the computing cluster 309a.

3. Example Methods and Applications Thereof

Figure 4:
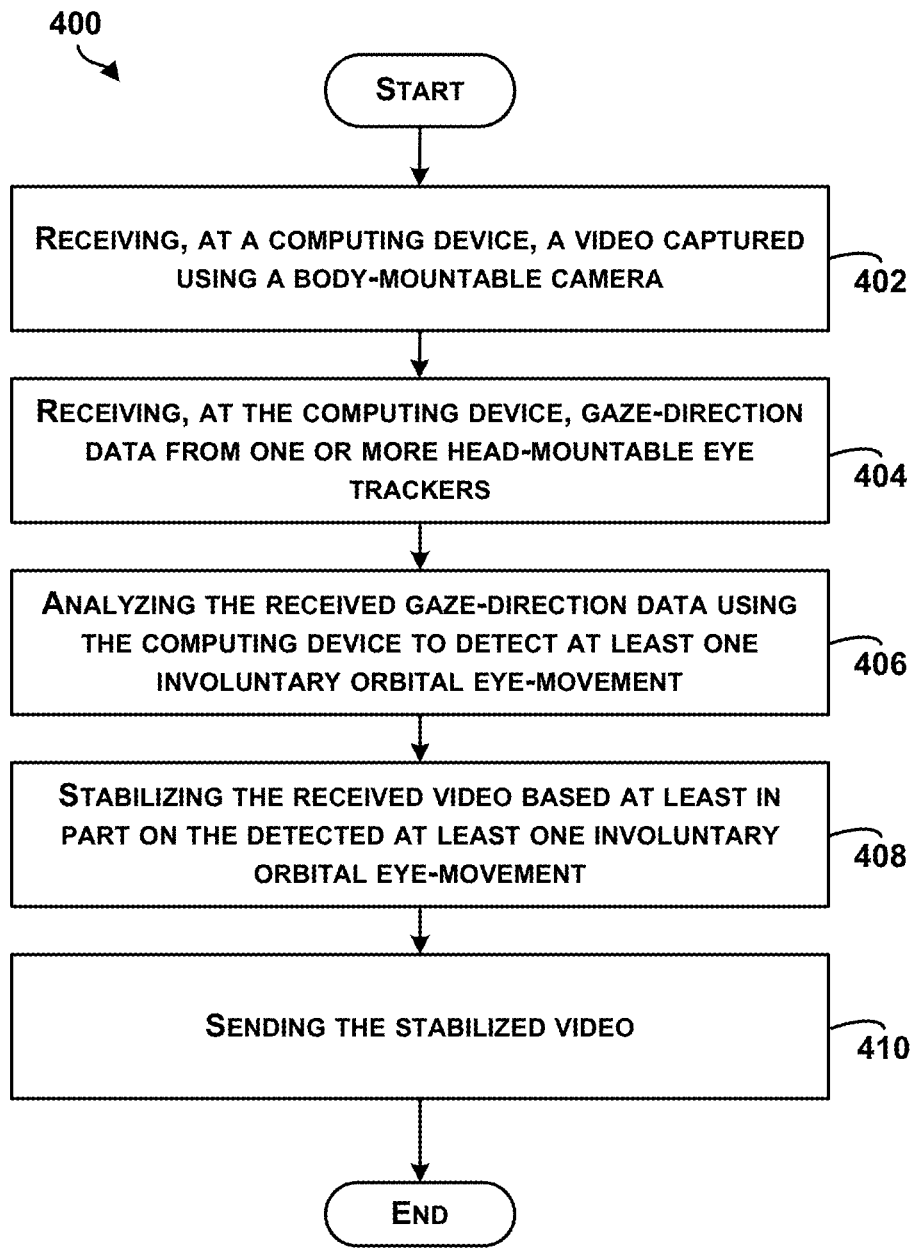
FIG. 4 is a block diagram of an example method of stabilizing a video.

FIG. 4 is a block diagram of an example method 400 of stabilizing a video. Method 400 shown in FIG. 4 presents an embodiment of a method that could be used with any of the systems of FIGS. 1-3, for example, and may be performed by a device, such as any devices illustrated in FIGS. 1-3, or components of the devices illustrated in FIGS. 1-3. Method 400 may include one or more operations, functions, or actions as illustrated by one or more of blocks 402-410. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Furthermore, for the method 400 and other processes and methods disclosed herein, each block in FIG. 4 may represent circuitry that is wired to perform the specific logical functions in the process.

Initially, at block 402, the method 400 includes receiving, at a computing device, a video captured using a body-mountable camera. In one example, the body-mountable camera may be a head-mountable camera. For instance, the camera may be a component of any of the wearable computing systems in FIGS. 1A-1D. In another instance, the camera may be a head-mountable camera that is not part of a wearable computing system. For instance, the head-mountable camera may be a separate device that is connected to a computing device via a wired or wireless connection. It is contemplated that the camera may also be mounted to other parts of a user such as an arm, wrist, hand, chest, torso, etc.

In one example, the body-mountable camera may capture point-of-view (POV) video. For instance, the video may be captured from a viewpoint of a user to which the body-mountable camera is attached. Thus, the video may be a forward-facing video captured by the body-mountable camera. In some instances, the body-mountable camera may include a wide-angle lens that is configured to capture a wide field-of-view (FOV) video. The wide-angle lens may enable more of a scene in front of a user to be included in a video as compared to an amount of the scene included in a video that is captured with a normal lens.

In one scenario in which a video having a wide FOV is captured by the head-mountable camera, a portion of the wide FOV may be selected and saved in a memory or provided to another computing device. For example, the received video may include a wide FOV video as well as information indicating a selected portion within the wide FOV. In some examples, the selected portion may be constant throughout the duration of the received video. In other examples, the selected portion may be dynamic such that different segments of the received video include information identifying different selected portions. This may be due to a change in zoom or camera angle input by the user while the video is captured, for example.

At block 404, the method 400 includes receiving, at the computing device, gaze-direction data from one or more head-mountable eye trackers. In one example, an eye-tracker may be a camera that focuses on one or both eyes to record eye-movements. In another example, a first head-mountable eye tracker may track eye-movements of a first eye of a user while a second head-mountable eye tracker may track the eye-movements of a second eye of a user. The eye tracker may be any of various types of eye-trackers and may provide the eye-movement data to a computing device such as a computing device remote from the user or a computing device coupled to the eye tracker. Eye-movement data may subsequently be processed to determine gaze-direction data. For instance, eye-movement data may be processed to determine gaze-direction data with respect to a forward-facing direction of a user.

In one example, eye-movement data may be determined based on an optical method for measuring eye motion. For example, light (such as infrared light) that is reflected from a user's eye(s) may be sensed by a camera or other type of optical sensor. Based on changes in the reflection information, eye rotation information may be determined using Bright Pupil or Dark Pupil eye tracking techniques, for example. In one instance, features such as corneal reflections and the center of the pupil of an eye may be tracked over time. In other instances, a pupil/iris boundary and/or iris/sclera boundary may be tracked.

Eye rotation information may subsequently be compared to a forward-facing eye position to determine gaze-direction data. The received gaze-direction data may include information associated with points of gaze over time that are described with reference to an absolute forward-facing direction or relative to an orientation of a user's head.

At block 406, the method 400 includes analyzing the received gaze-direction data using the computing device to detect at least one involuntary orbital eye-movement. Eye-movement may include voluntary and involuntary movement of the eyes. Voluntary eye-movement may take place using small, fast jumps in horizontal and/or vertical directions called saccades. Saccades are the fastest movements produced by the human body. For instance, a saccade to an unexpected stimulus (e.g., a noise, movement, or flash of light) may take about 200 milliseconds to initiate, and then last from about 20-200 milliseconds.

Involuntary eye-movements may be slower than voluntary eye movements and the result of reflexes produced in response to a detected head movement, for example. As an example, the vestibulo-ocular reflex (VOR) may allow the eyes to remain fixed on a target when the head moves. The VOR produces eye movements that stabilize images on the retina during head movement by producing an eye movement in the opposite direction. For example, during fixation if the head moves to the right, the eyes move to the left in order to compensate and stabilize the images on the retinas of the eyes. The VOR has may include rotational and translational movements. If the head rotates about any axis, distant visual images are stabilized by rotating the eyes about the same axis, but in the opposite direction. If the head translates, a fixation point may be maintained by rotating gaze direction in the opposite direction.

In some examples, a processor, such as a processor of a server or a wearable computing device, may analyze the gaze-direction data to identify one or more orbital eye-movements. The orbital eye-movements may include rotations of the eye such that the position of the pupil with respect to an orbit (or socket of the eye) or stationary center of the eye is adjusted. In one instance, based on the characteristics of a detected orbital eye-movement, the detected orbital eye-movement may be classified as a voluntary or involuntary eye-movement.

For example, the processor may determine that a given orbital eye-movement is an involuntary eye-movement based on a speed and/or size of the given orbital eye-movement. In one example, a speed, such as an angular speed, of a given orbital eye-movement may be compared to a nonzero threshold speed to determine whether the orbital eye-movement is an involuntary eye-movement. For instance, if the given orbital eye-movement is less than the nonzero speed threshold, the given orbital eye-movement may be determined to be an involuntary eye-movement. In another example, a size of the given orbital eye-movement, such as an arc length or angle of eye-movement, may be compared to a nonzero threshold size to determine whether the orbital eye-movement is an involuntary eye-movement. In one example, if the size of the given orbital eye-movement is less than the nonzero threshold size, the given orbital eye-movement may be determined to be an involuntary eye-movement.

In another example, a processor may determine that a given orbital eye-movement is an involuntary eye-movement based on a relationship between a gaze depth and a nonzero gaze depth threshold. For instance, eye-movement data may be processed to determine a gaze depth, based on a vergence measurement (i.e., the angle between viewing axes of a user's eyes) or an estimated three-dimensional gaze position. In one instance, if a determined gaze depth is greater than a nonzero gaze depth threshold, an associated orbital eye-movement may be determined to be an involuntary eye-movement.

In some examples, a vergence measurement may also be used to improve the tracking of a subject of interest within a FOV of the head-mountable camera. For example, for a distant subject of interest, the position of the user's eyes and the position of the head-mountable camera may be approximated as being the same position. However, for a subject of interest that is near the user, an estimate of the distance to the subject of interest with respect to the field of view of the head-mountable camera may be solved for to compensate for the fact that the user's eyes and head-mountable camera are not in the exact same position. Based on a determined gaze depth with respect to a coordinate system defined with respect to the user's eyes, and a known transform between the position of the user's eyes and the position of the head-mountable camera, an improved estimate of the position of a subject of interest in the image space of the FOV of the head-mountable camera can be found.

The processor may provide information associated with one or more determined involuntary orbital eye-movements to a video stabilizing component. In one example, the video stabilizing component may be a processor in a server. In another example, the video stabilizing component may be a processor associated with a wearable computing device. At block 408, the method 400 includes stabilizing the received video based at least in part on the detected at least one involuntary orbital eye-movement.

In one example, stabilizing the received video based on an involuntary orbital eye-movement may involve determining an instance in time at which the involuntary orbital eye-movement occurred and changing a recorded portion for the received video at the instance in time during the video. For example, in a scenario in which a wide FOV video is cropped to select a portion to be recorded, the portion may be dynamically selected and adjusted at the instance in time in response to and based on the detected involuntary orbital eye-movement. Additionally, stabilizing the video may include refraining from changing the recorded portion at a second instance in time in response to detecting a voluntary orbital eye-movement at the second instance in time.

In another example, optomechanical components may be used to adjust, in-real-time, a portion of a scene that is recorded. For instance, an optical image stabilizer may be used to adjust a portion of a scene that is captured by the body-mountable camera. As an example, the optical image stabilizer may be a lens-based stabilization system that varies an optical path to an image sensor of the body-mountable camera based on received gaze-direction data. One or more lenses within an optics train of the body-mountable camera may be manipulated to move a portion of the scene that is projected on the image sensor of the body-mountable camera in response to information associated with a detected involuntary orbital eye-movement. In one instance, the optics train of the body-mountable camera may be manipulated to select a cropped portion of a wide-FOV that is placed on the image sensor of the body-mountable camera. Thus, in some instances, the optical image stabilizer may adjust the portion of a scene that is recorded by the body-mountable camera.

In a further example, the method 400 may also include receiving camera-movement data from one or more motion detectors and orientation detectors. For instance, a motion detector and/or orientation detector may be included with and coupled to the body-mountable camera. In another instance, the motion detector and/or orientation detector may be coupled to a wearable computing device to which the body-mountable camera is rigidly connected. Thus, camera-movement data from the motion detector and/or orientation detector may be indicative of motion and/or orientation of the body-mountable camera.

In some examples, the camera-movement data may be correlated with orbital eye-movement data to detect involuntary orbital eye-movements. In a scenario in which a user is capturing a video with a head-mounted camera while focusing their gaze on an object, the position of the head-mounted camera may shake or move slightly as the user's head moves (due to slight movements in an orientation of a user's head when walking, running, or even standing still). As a reflex, the user's eyes may involuntary move to maintain their focused gaze in a direction to compensate for the head movement. For example, the user's eyes may move in the opposite direction that the user's head moves. The movements of the eyes, as determined by a head-mountable eye-tracker, may therefore correlate with the movement of the head. Accordingly, in an instance in which the camera-movement data correlates strongly with an orbital eye-movement, the orbital eye-movement may be determined to be an involuntary orbital eye-movement based on the correlation.

In another example, the camera-movement data may also be used to determine an adjustment to a recorded portion of the received video for stabilizing the video. For instance, an average of the detected involuntary orbital eye-movement and an inverse of the camera-movement data may be calculated and used as the basis for changing the recorded portion. In some examples, the selected portion may be adjusted by an amount that is proportional to the average.

At block 410, the method 400 includes sending the stabilized video. For example, the stabilized video may be sent to a display component for real-time display or sent to a memory component for storage. Additionally, the stabilized video may be sent to another computing device for display or storage.

One or more blocks of the method 400 may be performed by a server system or a wearable computing device. For example, one or any combination of a remote server system and a wearable computing system may perform the functions of capturing video from the body-mountable camera, capturing the eye-movement data, determining gaze-direction data, correlating the gaze-direction data with camera-movement data, and processing the video and/or adjusting the recorded portion to stabilize the video. In some examples, the functions may be performed in real-time (as the video is being captured) such that a recorded video is stabilized. In other examples, the functions may be performed in post-processing (after the video is captured).

Figure 5A:
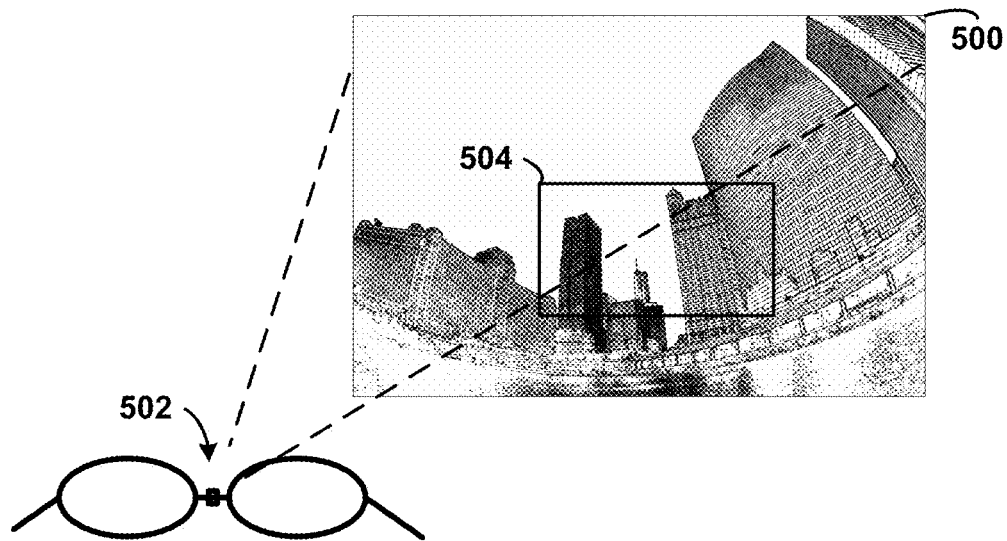
FIG. 5A is a conceptual illustration of a wide field-of-view (FOV) of a head-mountable camera.

FIG. 5A is a conceptual illustration of a wide field-of-view (FOV) 500 of a head-mountable camera 502. In one example, the head-mountable camera 502 may capture a video of the wide FOV 500. In a post-processing configuration, in which the video may be processed after the capture, the wide FOV 500 may be recorded in a memory. Additionally, information associated with a portion 504 of the wide FOV 500 may be recorded as well. The portion 504 of the wide FOV 500 may vary or may be fixed with respect to the wide FOV 500. For instance, the portion 504 may be a fixed center portion of the wide FOV 500.

In another example, in which a computing device may be configured to stabilize the video in real-time, the portion 504 may be dynamically adjusted based on detected involuntary orbital eye-movement data and/or camera-movement data. In some embodiments, aspects of the wide FOV 500 and/or portion 504, such as heights, widths, shapes, location of the portion 504 within the wide FOV 500, and/or other aspects can be dynamically adjusted. Although the wide FOV 500 and portion 504 are each illustrated as a rectangle, the wide FOV 500 and the portion 504 may be of any shape or size.

Figure 5B:
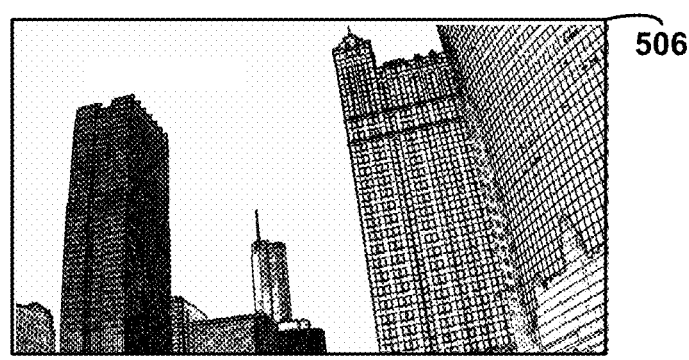
FIG. 5B is a conceptual illustration of a frame of a video captured from the wide FOV of FIG. 5A.

FIG. 5B is a conceptual illustration of a frame 506 of a video captured from the wide FOV 500 of FIG. 5A. As shown in FIG. 5B, in some examples, a video may be recorded based on the portion 504 of the wide FOV 500. In an instance in which a user is looking around by moving their head, walking, or running, the wide FOV 500 and the portion 504 may each move such that a different portion of an environment of the user is captured in the wide FOV 500 and portion 504. Movements of the head-mounted camera 502 may create a shaky or unstable video. For example, when comparing the positions of objects in the frame 506 with positions of the same objects in a subsequent frame, the objects may appear to bounce up or down due to changes in position and/or orientation of the head-mountable camera 502.

Figure 6A:
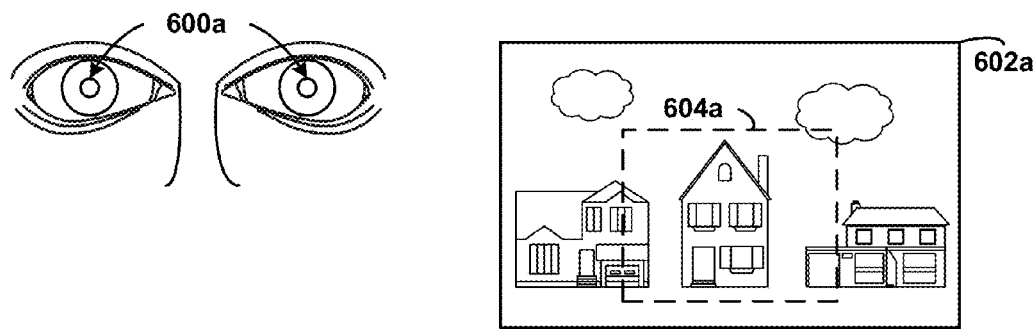
FIGS. 6A-6E conceptually illustrate examples of stabilizing a video.

In some examples, detected involuntary orbital eye-movements may be used to dynamically adjust a recorded portion of the received video to stabilize the video. FIGS. 6A-6E conceptually illustrate examples of stabilizing a video. As shown in FIG. 6A, a user's eyes may initially be in a first position 600a as the user is gazing in a forward direction while a wide FOV 602a of a scene is captured in a video. Additionally, information associated with a selected portion 604a may be stored for frames of the captured video.

Figure 6B:
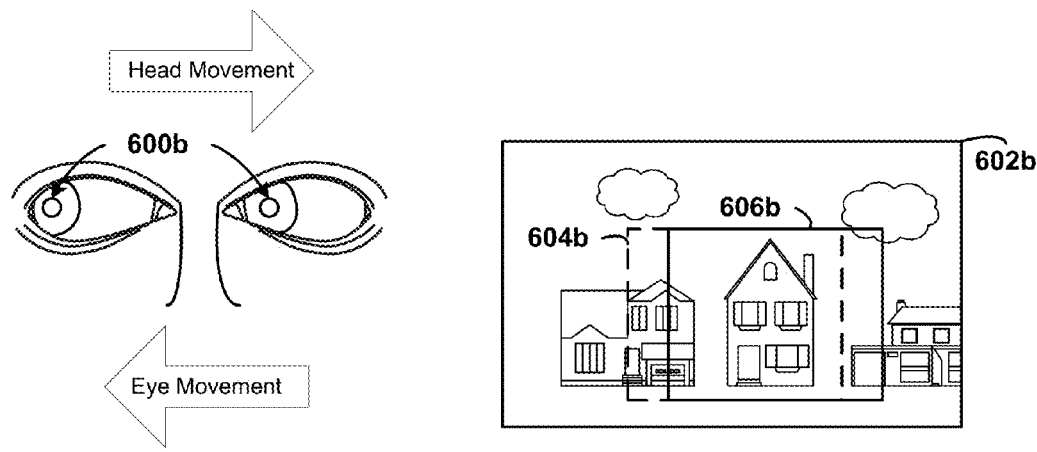

As shown in FIG. 6B, in response to a head movement to the person's left (which is to the right in FIG. 6B), a wide FOV 602b and selected portion 604b may also move, such that information to the left of the scene is captured in the video. Also in response to the head movement to the left, the user's eyes may move to a second position 600b that is to the right of the first position 600a, which is to the left in FIG. 6B. A processor may detect an involuntary orbital eye-movement to the right, and stabilize the received video based on the detected involuntary orbital eye-movement. In one example, the processor may determine a change to the selected portion 604b and adjust for the change in position of the selected portion 604b such that a stabilized portion 606b results. In some instances, a frame of the video captured from the selected portion 604a of the wide FOV video 602a of FIG. 6A may match a frame of the video captured from the stabilized portion 606b of the wide FOV video 602b of FIG. 6B.

Figure 6C:
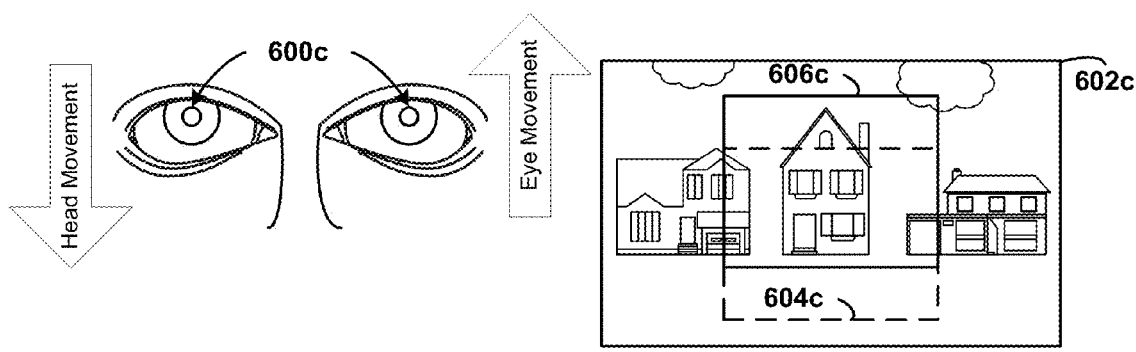

FIG. 6C shows a similar example in which a user's eyes move to a third position 600c in response to a downward head movement. In response to the downward head movement, the wide FOV 602c and selected portion 604c result. In one instance, based on a detected upward involuntary orbital eye-movement, a stabilized portion 606c within the wide FOV 602c may be determined and recorded.

Although FIGS. 6A-6C are described with respect to horizontal and vertical orbital eye-movements, an involuntary orbital eye-movement that is a combination of horizontal and vertical orbital eye-movements may also be determined. In addition, involuntary orbital eye-movements in response to a rotational or torsional head movement of the user are also possible. For instance, in the case of a detected rotational eye-movement, a selected portion within a wide FOV may be rotated such that the boundaries of a stabilized portion are no longer parallel to the boundaries of the wide FOV.

Figure 6D:
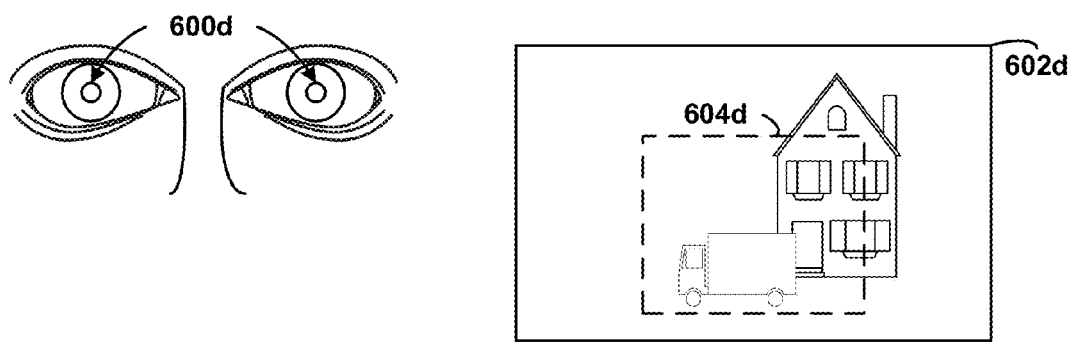

The methods and systems described herein may also be applicable to examples in which a user's point of interest is moving. As shown in FIG. 6D, a user may be watching a moving truck at a first instance in time. For example, the truck may be substantially in front of the user and the user's eyes may be in a first position 600d. Additionally, a wide FOV 602d of the scene may be captured by a camera. Moreover, information associated with a selected portion 604d may be stored for the first instance in time.

Figure 6E:
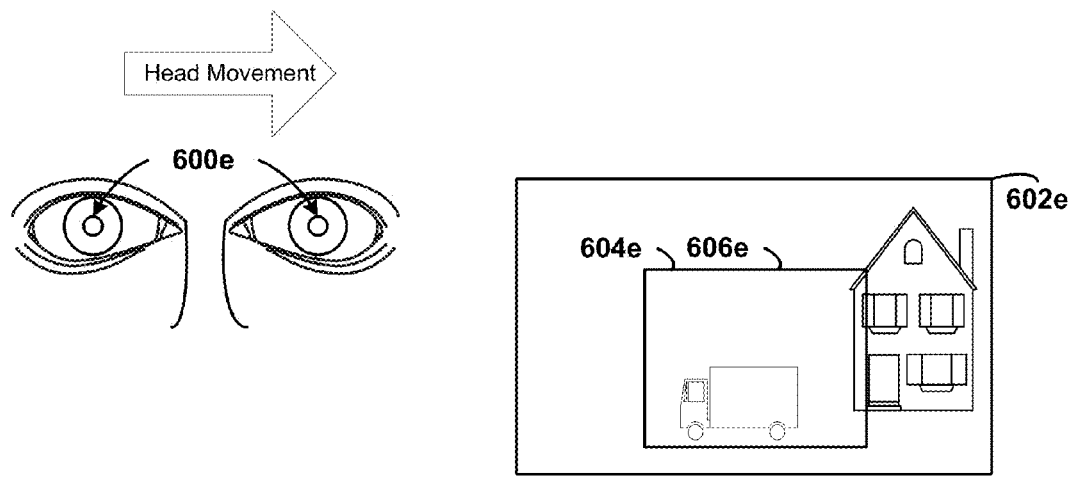

In the example in which the truck is moving to the left (from the point of view of the user), the user may move their head to the left. As shown in FIG. 6E, the user's gaze direction (as measured relative to the user's head) may remain substantially unchanged, because, for example, the user's head is moving to track the moving truck and stabilize the image of the truck on the user's retinas. Thus, the user's eyes may be in a position 600e at a second instance in time. Note that the user's gaze direction did not change relative to the user's head between the first instance in time and the second instance in time. However, while the scene captured within the wide FOV 602e changed, a stabilized portion 606e that is the same as a selected portion 604e may correctly be determined at the second instance in time. Thus, the video stabilization techniques may still be applicable for tracking moving points of interest.

As another example, a user may be reading text on a monitor. While the point of interest is moving as the user reads various words of the text, the user may move their head slightly, for example left to right for each line of text. Additionally, the user may move their gaze direction lower as each line of text is read. Therefore, some of the stabilization of the image the user is reading on the user's retina is due to the head movement while some of the stabilization of the image the user is reading is due to changes in gaze-direction. A stabilized video in this example may still crop the video to the words the user is actually reading. Thus, the methods may be applicable to stabilizing a video while a user's point of interest is fixed or moving, in the presence or absence of head movements for tracking a moving point of interest.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving, at a computing device, a video captured using a body-mountable camera;
    receiving, at the computing device, gaze-direction data from one or more head-mountable eye trackers;
    analyzing the received gaze-direction data using the computing device to detect at least one involuntary orbital eye-movement;
    stabilizing the received video based at least in part on the detected at least one involuntary orbital eye-movement; and
    sending the stabilized video.

2. The method of claim 1, wherein the body-mountable camera comprises a head-mountable camera.

3. The method of claim 1, wherein the received video comprises point-of-view video.

4. The method of claim 1, wherein the gaze-direction data is taken with respect to a forward-facing direction, and wherein the body-mountable camera captures at least a portion of the video in a direction other than the forward-facing direction.

5. The method of claim 1, wherein analyzing the received gaze-direction data to detect the at least one involuntary orbital eye-movement comprises:
    detecting, from the received gaze-direction data, one or more orbital eye-movements; and
    determining that at least one of the one or more orbital eye-movements is involuntary.

6. The method of claim 5, wherein the at least one of the one or more orbital eye-movements is determined to be involuntary, based on a speed of the at least one of the one or more orbital eye-movements being less than a nonzero threshold speed.

7. The method of claim 5, wherein the at least one of the one or more orbital eye-movements is determined to be involuntary, based on a size of the at least one of the one or more orbital eye-movements being less than a nonzero threshold size.

8. The method of claim 5, further comprising determining a gaze depth associated with the gaze-direction data, wherein the at least one of the one or more orbital eye-movements is determined to be involuntary based on the determined gaze depth.

9. The method of claim 1, further comprising receiving camera-movement data from one or more of motion detectors and orientation detectors, wherein stabilizing the received video is further based on the received camera-movement data.

10. The method of claim 1, wherein stabilizing the received video, based at least in part on the detected at least one involuntary orbital eye-movement, is performed in real-time.

11. The method of claim 1, wherein stabilizing the received video, based at least in part on the detected at least one involuntary orbital eye-movement comprises:
    changing a recorded portion of the received video in response to detecting involuntary orbital eye-movements; and
    refraining from changing the recorded portion of the received video in response to detecting voluntary orbital eye-movements.

12. The method of claim 11, wherein the received video comprises a wide-field-of-view (wide-FOV) video, and wherein changing the recorded portion of the received video comprises dynamically selecting a portion of the wide-FOV video that is recorded.

13. The method of claim 1, further comprising varying an optical path of the body-mountable camera to move an image that is projected on a camera sensor plane of the body-mountable camera.

14. A system comprising:
    a non-transitory computer-readable medium;
    program instructions stored on the non-transitory computer-readable medium and executable by at least one processor to:
        receive a video captured by a body-mountable camera;
        receive gaze-direction data from one or more head-mountable eye trackers;
        analyze the received gaze-direction data to detect at least one involuntary orbital eye-movement;
        stabilize the received video based at least in part on the at least one involuntary orbital eye-movement; and
        send the stabilized video.

15. The system of claim 14, wherein the system is head-mountable.

16. The system of claim 14, wherein analyzing the received gaze-direction data to detect the at least one involuntary orbital eye-movement comprises:
    detecting, from the received gaze-direction data, one or more orbital eye-movements; and
    determining that at least one of the one or more orbital eye-movements is involuntary.

17. The system of claim 16, wherein the program instructions are further executable by the at least one processor to receive camera-movement data from one or more motion detectors and/or orientation detectors indicative of movement of the body-mountable camera, and wherein the at least one of the one or more orbital eye-movements is determined to be involuntary based at least in part on the received camera-movement data.

18. The system of claim 14, wherein the program instructions are further executable by the at least one processor to receive camera-movement data from one or more motion detectors and/or orientation detectors indicative of movement of the body-mountable camera, and wherein stabilizing the received video is further based on the received camera-movement data.

19. The system of claim 14, wherein the program instructions are executable by the at least one processor to stabilize the received video in real-time.

20. A non-transitory computer-readable medium having stored thereon program instructions executable by at least one processor to:
- receive a video captured using a body-mountable camera;
- receive gaze-direction data from one or more head-mountable eye trackers;
- analyze the received gaze-direction data to detect at least one involuntary orbital eye-movement;
- stabilize the received video based at least in part on the detected at least one involuntary orbital eye-movement; and
- send the stabilized video.

21. The non-transitory computer-readable medium of claim 20, wherein analyzing the received gaze-direction data to detect the at least one involuntary orbital eye-movement comprises:
- detecting, from the received gaze-direction data, one or more orbital eye-movements; and
- determining that at least one of the one or more orbital eye-movements is involuntary.

22. The non-transitory computer-readable medium of claim 21, wherein the program instructions are further executable by the at least one processor to receive camera-movement data from one or more of motion detectors and orientation detectors that is indicative of movement of the body-mountable camera, and wherein the at least one of the one or more orbital eye-movements is determined to be involuntary, based at least in part on the received camera-movement data.

23. The non-transitory computer-readable medium of claim 20, wherein the program instructions are further executable by the at least one processor to receive camera-movement data from one or more of motion detectors and orientation detectors that is indicative of movement of the body-mountable camera, and wherein stabilizing the received video is further based on the received camera-movement data.

* * * * *